Feb. 6, 1962   J. HALTENBERGER   3,020,088
AUTOMOBILE FRONT SEAT BACKREST ADJUSTMENT
Filed March 4, 1957

INVENTOR.
July Haltenberger

United States Patent Office 3,020,088
Patented Feb. 6, 1962

3,020,088
AUTOMOBILE FRONT SEAT BACKREST ADJUSTMENT
Jules Haltenberger, P.O. Box 131, Rancho Santa Fe, Calif.
Filed Mar. 4, 1957, Ser. No. 643,672
1 Claim. (Cl. 297—357)

The present invention is a continuation-in-part of my co-pending application, Serial No. 441,352, filed July 6, 1954, for Automobile Front Seat Backrest Control, which issued on March 5, 1957, as U.S. Patent No. 2,783,826.

To create an access to the rear compartment in two-door automobiles, the backrest of the passenger, and also the driver's, is arranged to tilt forwardly. In older automobiles, the backrest operates on a transversely disposed substantially horizontal center-line. This sort of hinging, while permitting the rearward adjustment of the backrest for sleeping, when forward-tilted, it interferes with the passenger on the front seat. All the new automobiles that applicant is aware of, provide a diagonally disposed hinged center-line operated forwardly tilting backrest, that provides ample rear compartment access, and when forwardly tilted does not interfere with the passenger on the front seat. This hinging does not permit the rearward adjustment of the backrest for sleeping a feature, now increasingly in demand.

It is here proposed, and is the object of my invention, to provide a backrest with a transverse substantially horizontal hinge center-line, for rearward adjustment for sleeping, and to change the backrest hinge center-line to a diagonally disposed one, for the backrest forward tilting.

Further objects will appear as the description proceeds.

Figure 2:
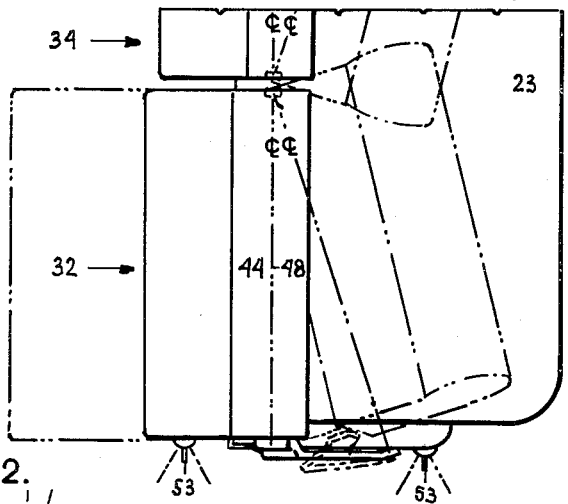
Figure 7:
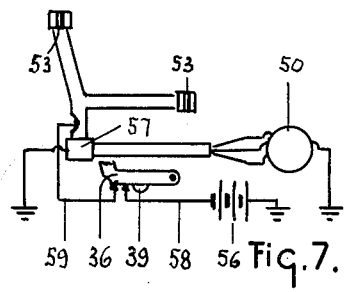
Figure 6:
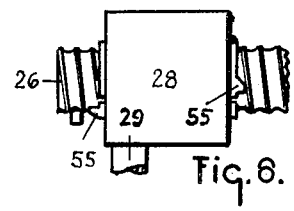
Figure 5:
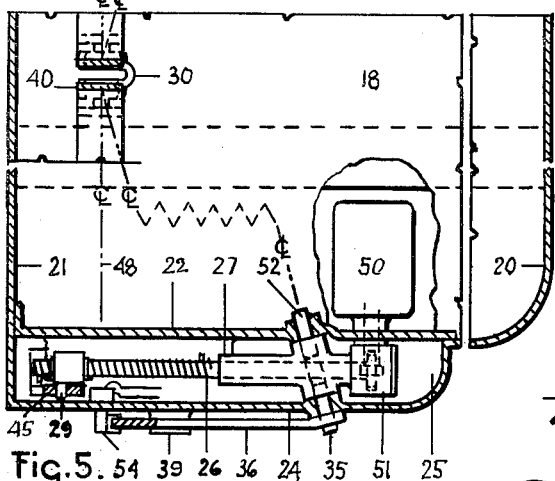
Figure 3:
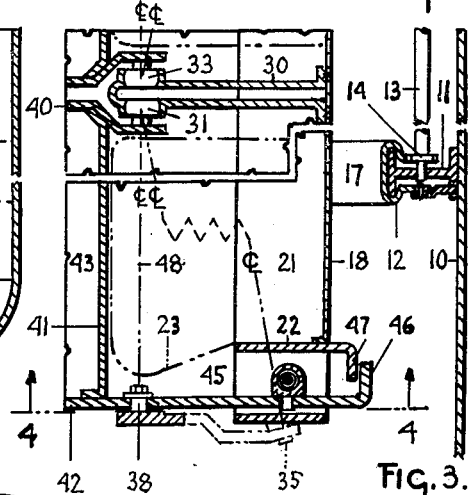
Figure 1:
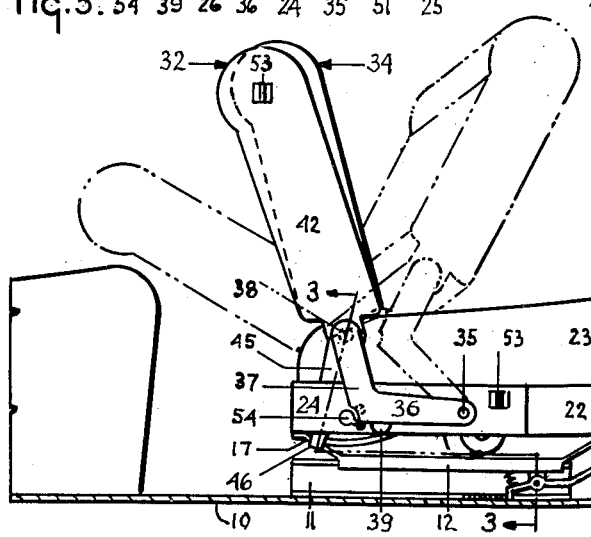
Figure 4:
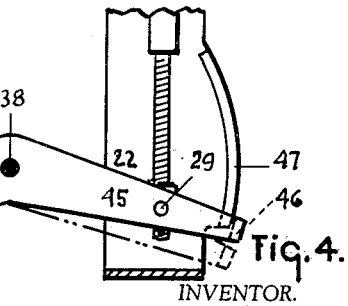

Referring to the drawings: FIG. 1 is an automobile front seat side elevation; FIG. 2 is a plan of the device; FIG. 3 is a section substantially on line 3—3 of FIG. 1 here shown in a somewhat larger scale; FIG. 4 is a section substantially on line 4—4 of FIG. 3; FIG. 5 is a horizontal section with parts broken away; FIG. 6 is an enlarged view of a part shown in FIG. 5; FIG. 7 is a wiring diagram.

Referring to FIGS. 1 to 6 inclusive, it will be seen, that to an automobile body floor 10, is secured a pair of (only one is shown) stationary side mounted H members 11. The H members top surfaces serve as slides for the seat fore or aft adjusting top hugging shoes 12. These shoes are operatively interconnected by shaft 13 and shoes engaging pinions 14 respectively, and their fore or aft adjusting position is releasably locked by a spring loaded latch 15, in the usual well known manner.

The shoes front extension 16 and rear extension 17 support a seat tray 18, having an upstanding front wall 20, rear wall 21 and side walls 22. In between these upstanding walls the tray supports a seat cushion 23. The side walls are provided with an additional outer side wall 24. Parts 18 to 24 inclusive form a seat frame. Walls 22 and 24 form a pocket 25 for a self-contained and self-aligning electrically operated seat backrest adjusting power jack, having a threaded portion 26, operatively protruding from housing 27, and an operating nut 28 having thereon an operating pin 29, operatively disposed on the threaded portion 26 (to be described).

The tray 18, as by spot welding, supports an upstanding member 30, upwardly terminating in part spherical surfaces for the operative adoption of universal hinge part ball 31, forming the inner hinge point of the passenger's backrest, indicated generally at 32, and part ball 33 forming the inner hinge point of the driver's backrest, indicated generally at 34.

The seat frame outer side wall 24, is provided with a diagonally disposed trunnion pin 35 (the inwardly extension of its center-line bisects the center of ball 31) operatively supporting one end of a link normally horizontal arm 36, said link having an upstanding portion 37, and having on its end a substantially horizontally inwardly extending bearing pin 38 (the inward extension of its center-line bisects the center of ball 31). The link portion 36 normally rests on a stationary pad 39, protruding from outer wall 24, therefore, pin 38 is normally stationary.

The passenger's backrest 32 includes the part ball 31, therewith integral generally upstanding inner wall 40, bottom wall 41, and generally vertical outer wall 42. The rear parts of these walls are interconnected by a rear wall 43 on which rests the usual backrest cushion 44. It will be noted, that the passenger backrest outer wall 42 is provided with an integral generally downwardly extending arm 45, having an operative opening for pin 38, an operative opening for power jack nut pin 29, and terminating in an inwardly bent lip 46, either disposed under a backrest arcuate path holding substantially arcuate member 47, which is an arcuate downward extension of wall 22, or disposed beyond the arc portion of member 47 (to be described).

As illustrated in FIG. 1, the passenger's backrest outer wall 42 and integral arm 45, for backrest rearward adjustment, operate from a substantially horizontal center-line 48 which passes through the center of bearing pin 38 and the center of part ball 31. The backrest can be adjusted rearwardly until it reaches its extreme rear adjusted position shown in chain lines. In the rearward adjustment from the normal generally vertical position of the backrest, the lip 46 is under the arc portion of member 47, preventing the diagonal tilting of the backrest.

Applicant prefers to adjust the backrest rearwardly by a well known power jack, operated by an electric motor 50, secured on housing 51 containing gear reductions and forming a part of housing 27, hingedly secured on the seat frame, by diagonally disposed trunnion pin 35, and therewith aligned pin 52 in wall 22. My co-opending application Serial No. 395,210 filed November 30, 1953, for Automobile Front Seat Independent Adjustment (now abandoned), describes the power jack. Here, it is arranged to be controlled by electric switches 53, conveniently accessible to any position of the passenger. It will be noted from FIG. 1, that when the link arm 36 rests on pad 39, the bottom rear end thereof operates a rotary spring loaded electric current circuit switch 54, here shown in current flowing position, (to be described). Therefor, when either of the switches 53 is moved rearwardly the passenger seat backrest moves rearwardly. When either of them is moved forwardly, the backrest moves forwardly up to the position of alignment with the driver's backrest 34. The extreme forward or rearward positions of the backrest are controlled by the well known spacer nose cams 55 shown in FIG. 6, and described in my last named application.

When the passenger's backrest is aligned with the driver's backrest 34, here shown in a normal generally vertical position, the lip 46 on the end of arm 45 is moved beyond the end of the arc portion of member 47, as indicated by the chain lines in FIG. 4, and the passenger seat backrest can be tilted forwardly. Now it will operate from the center-line of diagonally disposed trunnion pins 35 and 52 and part ball 31 center respectively. In this operation, the power jack and all of its associated parts rotate around the pins 35 and 52 at the same degree angle as the backrest forward tilt, and is returned to the position illustrated, when the backrest is placed in its normal position.

FIG. 7 illustrates the wiring diagram. The current from battery 56 can reach the switches 53, relay in box 57, and motor 50 respectively, only when the link normally horizontal arm 36 rests on pad 39, to establish a current flow between conduits 58 and 59. This will assure that the lip 46 will move under the arc portion of member 47, the lip in this position preventing the forward tilting of the backrest, a feature of particular value when the passenger sleeps on the backrest and the vehicle becomes involved in a collison.

The drawings indicate that the driver's backrest is tiltable forward on a diagonal axis and is provided for a rearward parallel adjustment. The backrest position adjusting means rear end is operatively connected to the backrest. By operatively positioning the adjusting means front fulcrum on the seat frame to concide with the diagonal axis; the adjusting means will not interfere with the backrest forward tilting.

While I have herein shown and described only certain specific embodiments of my invention and have suggested only certain possible modifications, it will be appreciated that many changes and variations can be made to suit particular conditions and embodiments of use, without departing from the spirit and scope of my invention.

What applicant claims as his invention:

In a two-door automobile having a front seat and a rear seat, the front seat having a base and a backrest mounted on the base; the improvement comprising means mounting the backrest on the base for rearward tilting movement from a normal upright position to any of a plurality of rearwardly tilted positions, means connected to the backrest to hold the same in any of said plurality of rearwardly tilted positions against free forward tilting movement, and means mounting the backrest on the base for free forward tilting movement of the backrest from said normal upright position to provide easier access to the rear seat.

References Cited in the file of this patent

UNITED STATES PATENTS

| | | |
|---|---|---|
| 2,132,729 | Galamb et al. | Jan. 13, 1938 |
| 2,712,345 | Borisch | July 5, 1955 |
| 2,796,919 | Ginsberg | June 25, 1957 |
| 2,799,325 | Wubbe | July 16, 1957 |

FOREIGN PATENTS

| | | |
|---|---|---|
| 848,742 | France | July 31, 1939 |